(12) United States Patent
Nonaka et al.

(10) Patent No.: US 8,457,365 B2
(45) Date of Patent: Jun. 4, 2013

(54) DEVICE, METHOD AND COMPUTER READABLE RECORDING MEDIUM CONTAINING PROGRAM FOR EVALUATING IMAGE

(75) Inventors: Shunichiro Nonaka, Asaka (JP); Yousuke Shirahata, Kawasaka (JP)

(73) Assignee: FUJIFILM Corporation, Tokyo (JP)

( * ) Notice: Subject to any disclaimer, the term of this patent is extended or adjusted under 35 U.S.C. 154(b) by 984 days.

(21) Appl. No.: 12/052,512

(22) Filed: Mar. 20, 2008

(65) Prior Publication Data
US 2008/0232652 A1    Sep. 25, 2008

(30) Foreign Application Priority Data

Mar. 23, 2007    (JP) .................................. 2007-075829

(51) Int. Cl.
*G06K 9/00*    (2006.01)
(52) U.S. Cl.
USPC ............................ 382/118; 382/286; 382/218
(58) Field of Classification Search
USPC ............................ 382/305, 286, 218, 190, 118
See application file for complete search history.

(56) References Cited

U.S. PATENT DOCUMENTS

| | | | | |
|---|---|---|---|---|
| 6,819,778 B2 * | 11/2004 | Kamei | | 382/103 |
| 7,298,907 B2 * | 11/2007 | Hasegawa | | 382/209 |
| 7,444,354 B2 | 10/2008 | Kaburagi et al. | | |
| 7,676,146 B2 * | 3/2010 | Border et al. | | 396/80 |
| 7,693,413 B2 * | 4/2010 | Sueyoshi et al. | | 396/333 |
| 7,920,727 B2 * | 4/2011 | Weng et al. | | 382/118 |
| 2002/0181784 A1 | 12/2002 | Shiratani | | |
| 2005/0089246 A1 | 4/2005 | Luo | | |
| 2006/0274978 A1 | 12/2006 | Fukuda et al. | | |
| 2007/0058869 A1 * | 3/2007 | Matsuzaka et al. | | 382/190 |
| 2007/0160268 A1 * | 7/2007 | Uchida | | 382/118 |
| 2007/0230823 A1 * | 10/2007 | Weng et al. | | 382/286 |
| 2008/0187185 A1 * | 8/2008 | Misawa et al. | | 382/118 |
| 2009/0256926 A1 * | 10/2009 | Okada et al. | | 348/222.1 |
| 2010/0177207 A1 * | 7/2010 | Fukuda | | 348/222.1 |

FOREIGN PATENT DOCUMENTS

| | | |
|---|---|---|
| CN | 1908936 | 2/2007 |
| JP | 2002-10179 A | 1/2002 |
| JP | 2003-87442 A | 3/2003 |
| JP | 2004-361989 A | 12/2004 |
| JP | 2005-20446 A | 1/2005 |
| JP | 2005-56175 A | 3/2005 |
| JP | 2005-148915 A | 6/2005 |
| JP | 2005-148916 A | 6/2005 |
| JP | 2005-227957 A | 8/2005 |
| JP | 2007-28555 A | 2/2007 |
| JP | 2007-65940 A | 3/2007 |

\* cited by examiner

*Primary Examiner* — Vu Le
*Assistant Examiner* — Aklilu Woldemariam
(74) *Attorney, Agent, or Firm* — Birch, Stewart, Kolasch & Birch, LLP.

(57) ABSTRACT

An image evaluation device includes: an information acquiring unit to acquire, from an image containing at least one face, at least one type of information including at least the number of the at least one face and optionally including any of a size of the face, a position of the face in the image, an orientation of the face, a rotational angle of the face and a detection score of the face; and an individual evaluation value calculating unit to statistically calculate an individual evaluation value indicating a result of evaluation for each type of information based on the acquired information.

15 Claims, 14 Drawing Sheets

FIG.6
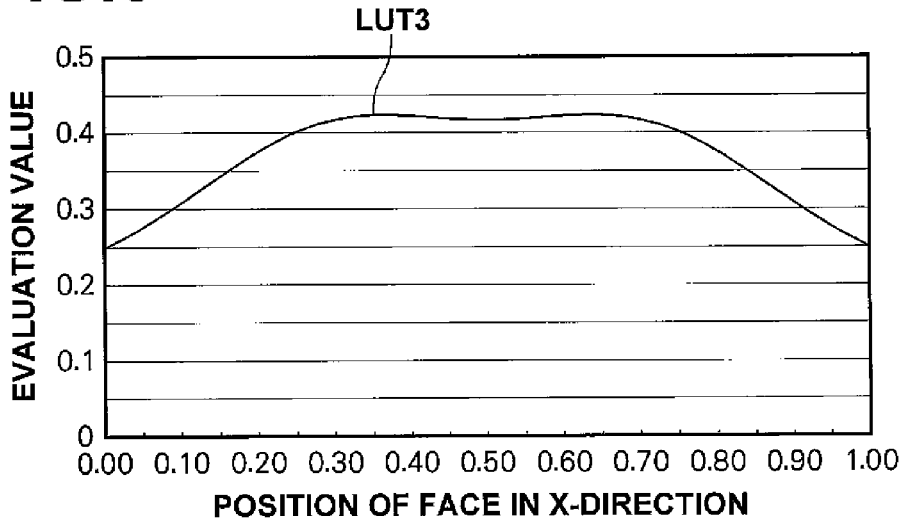
FIG.7
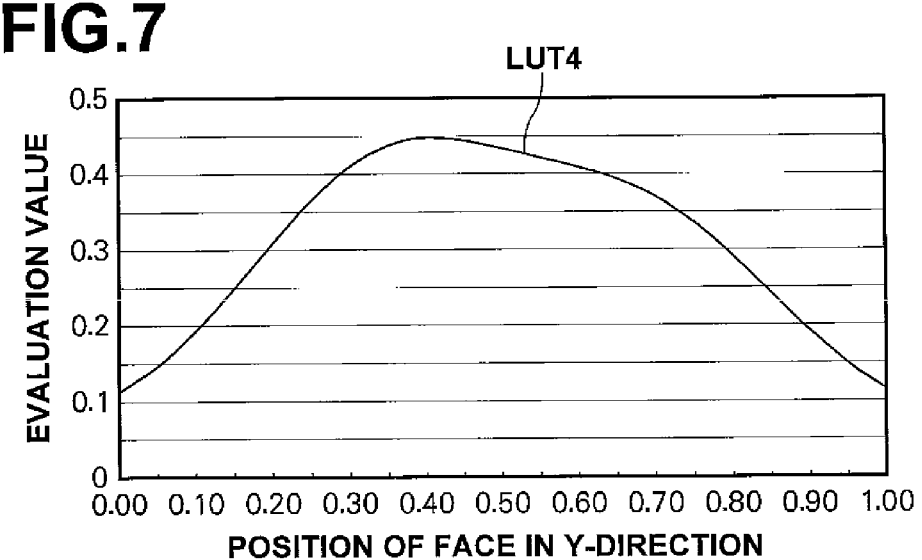
FIG.8
| ORIENTATION OF FACE | EVALUATION VALUE |
|---|---|
| SIDE | 0.29 |
| FRONT | 0.43 |
LUT5

| FEATURE INFORMATION | INDIVIDUAL EVALUATION VALUE | WEIGHTING FACTOR | |
|---|---|---|---|
| NUMBER | 0.55 | 0.20 | 0.110 |
| SIZE | 0.42 | 0.08 | 0.034 |
| POSITION (X-DIRECTION) | 0.41 | 0.08 | 0.033 |
| POSITION (Y-DIRECTION) | 0.40 | 0.06 | 0.024 |
| ORIENTATION | 0.43 | 0.08 | 0.032 |
| ROTATIONAL ANGLE | 0.40 | 0.06 | 0.024 |
| DETECTION SCORE | 0.35 | 0.08 | 0.028 |
| POSITIONAL RELATIONSHIP | 0.32 | 0.12 | 0.038 |
| FRONT FACE RATIO | 0.38 | 0.12 | 0.046 |
| FACE EVALUATION VALUE | | | 0.369 |

FIG.17

| NUMBER OF FACES | FEATURE INFORMATION | WEIGHTING FACTOR |
|---|---|---|
| 1 | NUMBER | 0.20 |
| | SIZE | 0.12 |
| | POSITION (X-DIRECTION) | 0.12 |
| | POSITION (Y-DIRECTION) | 0.10 |
| | ORIENTATION | 0.15 |
| | ROTATIONAL ANGLE | 0.11 |
| | DETECTION SCORE | 0.20 |
| 2 | NUMBER | 0.12 |
| | SIZE | 0.11 |
| | POSITION (X-DIRECTION) | 0.10 |
| | POSITION (Y-DIRECTION) | 0.08 |
| | ORIENTATION | 0.10 |
| | ROTATIONAL ANGLE | 0.08 |
| | DETECTION SCORE | 0.11 |
| | POSITIONAL RELATIONSHIP | 0.12 |
| | FRONT FACE RATIO | 0.15 |
| 3 | NUMBER | 0.12 |
| | SIZE | 0.08 |
| | POSITION (X-DIRECTION) | 0.05 |
| | POSITION (Y-DIRECTION) | 0.02 |
| | ORIENTATION | 0.07 |
| | ROTATIONAL ANGLE | 0.08 |
| | DETECTION SCORE | 0.10 |
| | POSITIONAL RELATIONSHIP | 0.11 |
| | FRONT FACE RATIO | 0.11 |
| ⋮ | ⋮ | ⋮ |

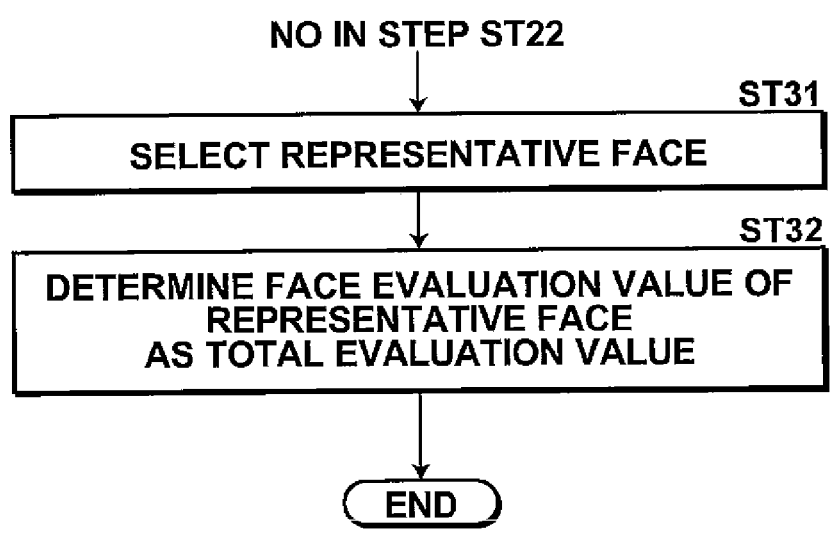

FIG.19

| DETECTED FACE | LARGEST FACE EVALUATION VALUE | LARGEST SIZE | POSITION (X-DIRECTION) CENTER | POSITION (Y-DIRECTION) CENTER | ORIENTATION | ROTATIONAL ANGLE | LARGEST DETECTION SCORE |
|---|---|---|---|---|---|---|---|
| FACE F1 | 0.38 | 0.20 | 0.20 | 0.30 | SIDE | -30 | 250 |
| FACE F2 | 0.45 | 0.25 | 0.40 | 0.20 | FRONT | 0 | 230 |
| FACE F3 | 0.40 | 0.33 | 0.65 | 0.25 | SIDE | 30 | 205 |
| REPRESENTATIVE FACE | FACE F2 | FACE F3 | FACE F2 | FACE F1 | FACE F2 | FACE F2 | FACE F1 |
| TOTAL EVALUATION VALUE | 0.45 | 0.40 | 0.45 | 0.38 | 0.45 | 0.45 | 0.38 |

FIG.20

NO IN STEP ST22

ST41 SET WEIGHTING FACTORS

ST42 CALCULATE TOTAL EVALUATION VALUE

END

FIG.21

| DETECTED FACE | FACE EVALUATION VALUE | WEIGHTING FACTOR | |
|---|---|---|---|
| FACE F1 | 0.21 | 0.25 | 0.053 |
| FACE F2 | 0.45 | 0.50 | 0.225 |
| FACE F3 | 0.33 | 0.25 | 0.083 |
| TOTAL EVALUATION VALUE | | | 0.361 |

DEVICE, METHOD AND COMPUTER READABLE RECORDING MEDIUM CONTAINING PROGRAM FOR EVALUATING IMAGE

BACKGROUND OF THE INVENTION

1. Field of the Invention

The present invention relates to an image evaluation device and an image evaluation method for evaluating images based on faces contained in the images, and a computer readable recording medium containing a program for causing a computer to carry out the image evaluation method.

2. Description of the Related Art

With widespread use of digital cameras and significant increase in capacity of recording media for storing images in recent years, users can store a lot of images in a single medium. However, it is troublesome for the users to select an image(s) to be processed (to be printed, for example) from a large number of images by visually checking the images. Therefore, in order to efficiently select such images, functions are demanded, such as for refining candidate images with certain conditions before the users finally determine images to be printed and/or for selecting images that are suitable to be printed according to user's taste based on evaluation of the images.

For example, Japanese Unexamined Patent Publication No. 2002-010179 proposes an approach in which each image is evaluated based on any of lightness of the image, an output value from an acceleration sensor and AF evaluation, and photos that are unsuitable to be printed are automatically excluded based on the results of the evaluation.

Japanese Unexamined Patent Publication No. 2004-361989 proposes an approach in which the orientation of a human face contained in each image is determined, an evaluation value for each image is calculated based on the determined orientation of the face, and a desired image is selected from a plurality of images based on the calculated evaluation values.

U.S. Patent Application Publication No. 20020181784 proposes an approach in which each image is evaluated using a result of total evaluation with respect to a plurality of evaluation items such as a ratio of a face in the image, whether eyes are open or shut, the orientation of a face, focus, blurring, lightness and the like.

U.S. Patent Application Publication No. 20050089246 proposes an approach in which a feature vector indicating image quality is calculated for a face region contained in an image, and the feature vector is used to evaluate the image quality of the face region.

Japanese Unexamined Patent Publication No. 2005-227957 proposes an approach in which a face is evaluated using results of evaluation with respect to the orientation, the size, and the like, of the face, and imaging conditions such as a lighting condition.

As described above, various approaches have been proposed for evaluating images based on faces contained in the images. However, the approaches described in the above-mentioned patent documents evaluate images by simply calculating evaluation values with respect to evaluation items. Therefore, their results not always reflect subjective evaluation by actual viewers of the images, and the evaluation by the actual viewers may differ from the calculated evaluation of the images. Further, the approaches described in the above-mentioned patent documents do not provide appropriate evaluation of an image which contains more than one faces.

SUMMARY OF THE INVENTION

In view of the above-described circumstances, the present invention is directed to providing more accurate evaluation of images using information about faces contained in the images.

An aspect of the image evaluation device according to the invention includes: information acquiring means to acquire, from an image containing at least one face, at least one type of information including at least the number of the at least one face and optionally including any of a size of the face, a position of the face in the image, an orientation of the face, a rotational angle of the face and a detection score of the face; and individual evaluation value calculating means to statistically calculate an individual evaluation value indicating a result of evaluation for each type of information based on the acquired information.

The term "evaluation value" herein is not a value that can be quantitatively calculated from an image, such as a feature vector, a signal-to-noise ratio or a resolution, but means an estimated value that is calculated so as to have a correlation with a possible evaluation level by a user who wants the evaluation of the image.

The term "statistically" herein means that the evaluation value is inductively found by using, as correct solution data, evaluation values of images selected as "being preferable" from a lot of sample images, and this is unlike to deductively find the evaluation value based on some assumptions. It should be noted that the correct solution data may be selected in any manner, and the correct solution data obtained through actual selection of images by evaluators may be used. The number of sample images for finding the evaluation values may be 300 or more, or optionally 1000 or more.

It should be noted that, in the image evaluation device of the invention, the information acquiring means may further acquire information including at least one of a positional relationship between faces if the image contains more than one faces and a front face ratio of the at least one face.

The "positional relationship between faces if the image contains more than one faces" may be indicated by an angle formed between a horizontal line in the image and a line segment connecting the center of a face to be evaluated and the center of the other of the faces.

The image evaluation device of the invention may further include face evaluation value calculating means to calculate a face evaluation value indicating a result of evaluation of the face based on the individual evaluation value.

The image evaluation device of the invention may further include total evaluation value calculating means to calculate a total evaluation value indicating a result of total evaluation of the image based on the face evaluation value.

In this case, the total evaluation value calculating means may select a representative face from the at least one face and calculate the total evaluation value based on the face evaluation value of the representative face. If the image contains more than one faces, the total evaluation value calculating means may calculate the total evaluation value by calculating a weighted sum of the face evaluation values of the faces.

In the image evaluation device of the invention, the total evaluation value calculating means may calculate the face evaluation value differently depending on the number of the at least one face.

An aspect of the image evaluation method according to the invention includes: acquiring, from an image containing at least one face, at least one type of information including at least the number of the at least one face and optionally including any of a size of the face, a position of the face in the image, an orientation of the face, a rotational angle of the face and a detection score of the face; and statistically calculating an individual evaluation value indicating a result of evaluation for each type of information based on the acquired information.

The image evaluation method according to the invention may also be provided in the form of a computer readable recording medium containing a program for causing a computer to carry out the method.

BRIEF DESCRIPTION OF THE DRAWINGS

FIG. 6 illustrates an evaluation value table LUT3 for a position of the face in the x-direction, FIG. 7 illustrates an evaluation value table LUT4 for a position of the face in the y-direction, FIG. 8 illustrates an evaluation value table LUT5 for an orientation of the face, FIG. 17 illustrates an example of feature information and weighting factors to be used depending on the number of faces, FIG. 18 is a flow chart illustrating a process according to a third embodiment of the invention, FIG. 19 is a table for explaining selection of a representative face and determination of a total evaluation value, FIG. 20 is a flow chart illustrating a process according to a fourth embodiment of the invention, FIG. 21 illustrates a specific example of calculation of a total evaluation value.

DESCRIPTION OF THE PREFERRED EMBODIMENTS

Figure 1:
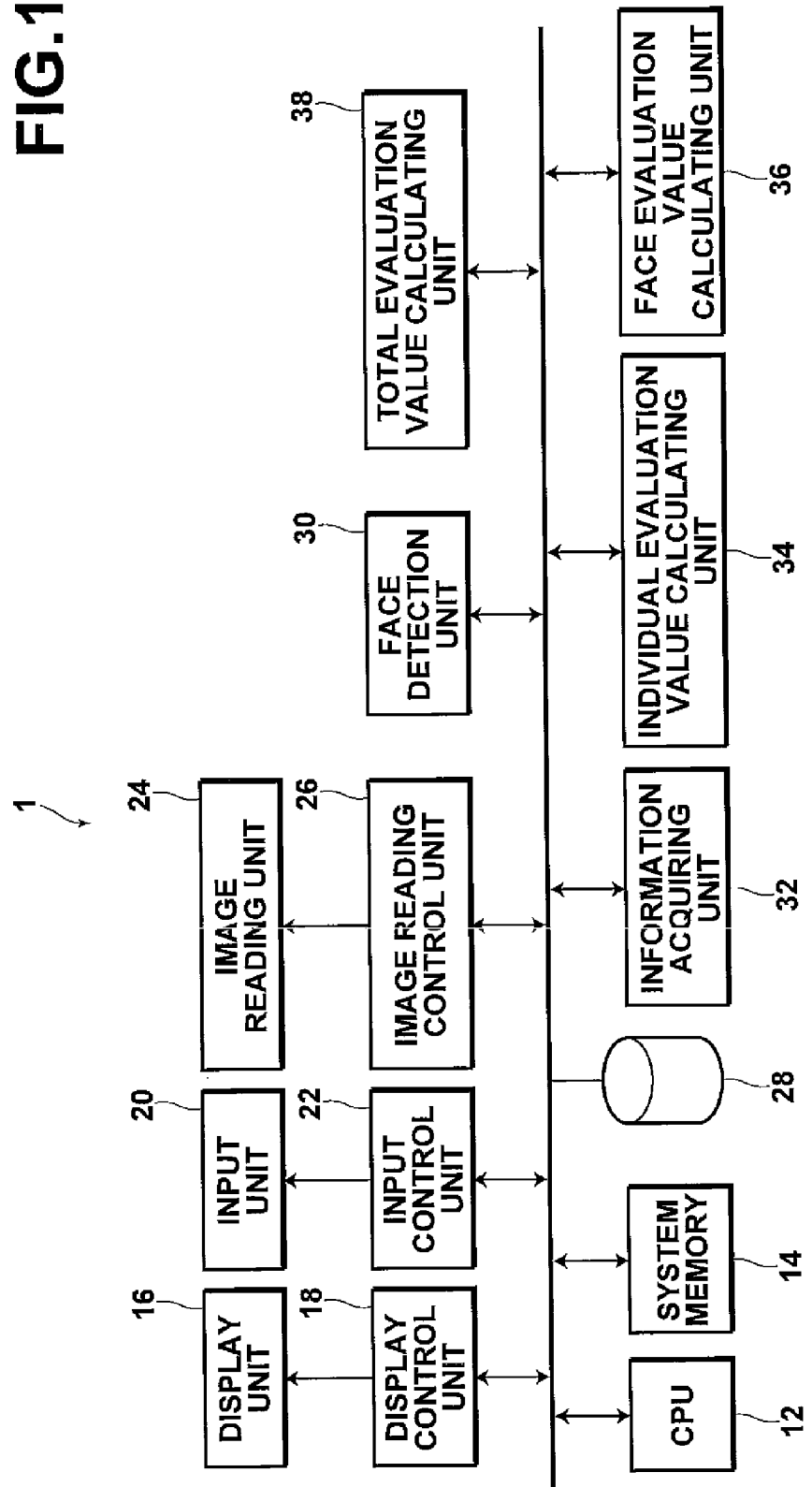
FIG. 1 is a schematic block diagram illustrating the configuration of an image evaluation device according to embodiments of the present invention.

Hereinafter, embodiments of the present invention will be described with reference to the drawings. FIG. 1 is a schematic block diagram illustrating the configuration of an image evaluation device according to embodiments of the invention. As shown in FIG. 1, the image evaluation device 1 of this embodiment includes: a CPU 12 that exerts various controls such as control on recording of image data and display control as well as control of various units forming the device 1; a system memory 14 formed by a ROM that stores a program to operate the CPU 12, a viewer software for viewing images and various constants and a RAM that provides a workspace for operations carried out by the CPU 12; a display unit 16 formed, for example, by a liquid crystal display monitor that displays various screens; a display control unit 18 that controls the display unit 16; an input unit 20 formed, for example, by a keyboard, a mouse and a touch panel for allowing the user to input various instructions to the device 1; and an input control unit 22 that controls the input unit 20.

The image evaluation device 1 further includes: an image reading unit 24 that reads out and records image data from and on a medium for storing image data representing images, such as a memory card; an image reading control unit 26 that controls the image reading unit 24; and a hard disk 28 that stores various information including the image data, evaluation value tables, which will be described later, and the like.

The image evaluation device 1 further includes: a face detection unit 30 that detects a face in an image; an information acquiring unit 32 that acquires feature information representing a feature of the face from the detected face; an individual evaluation value calculating unit 34 that calculates an individual evaluation value indicating an individual evaluation result for each feature information based on the feature information acquired by the information acquiring unit 32; a face evaluation value calculating unit 36 that calculates a face evaluation value which is an evaluation value for each face contained in the image; and a total evaluation value calculating unit 38 that calculates a total evaluation value indicating a result of total evaluation of the image.

Now, functions of the face detection unit 30, the information acquiring unit 32, the individual evaluation value calculating unit 34, the face evaluation value calculating unit 36 and the total evaluation value calculating unit 38 will be described in conjunction with a process carried out by the image evaluation device 1.

Figure 2:
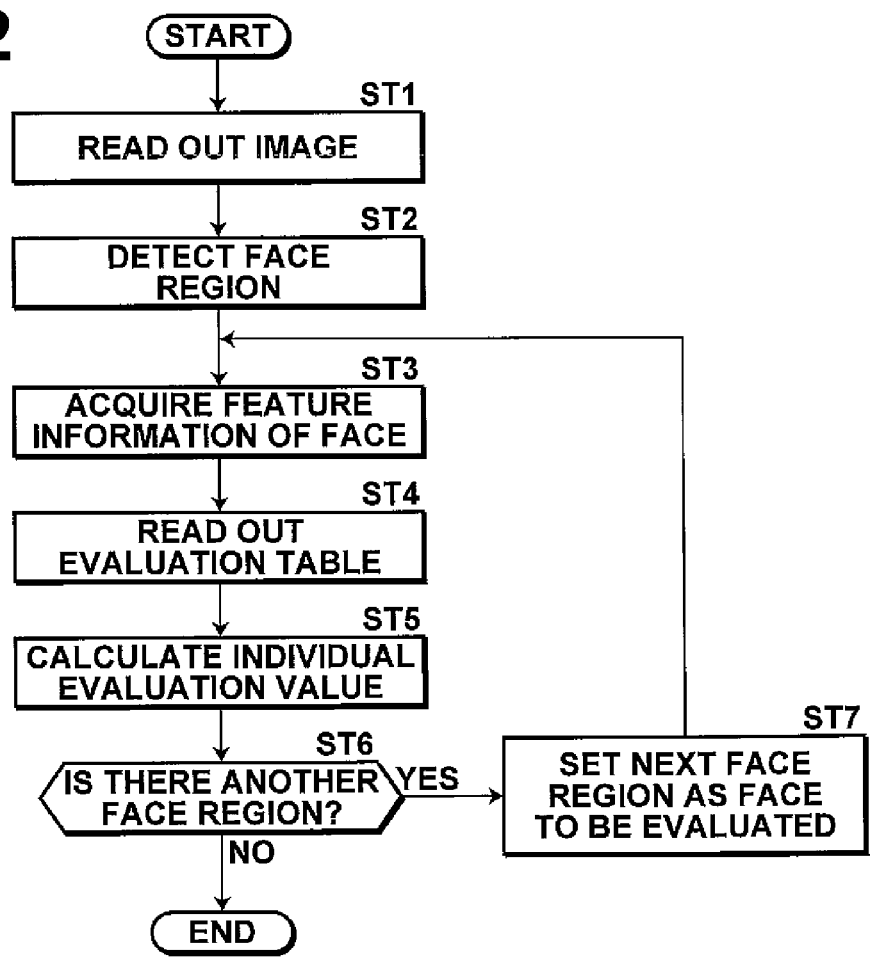
FIG. 2 is a flow chart illustrating a process according to a first embodiment of the invention.

FIG. 2 is a flow chart illustrating the process according to a first embodiment carried out by the image evaluation device 1 shown in FIG. 1. In the first embodiment, the individual evaluation value is calculated based on at least one type of feature information including at least the number of faces and optionally including any of a size of the face, a position of the face in the image, an orientation of the face, a rotational angle of the face, a detection score of the face, a positional relationship between faces if the image contains more than one faces and a front face ratio. Therefore, the face evaluation value calculating unit 36 and the total evaluation value calculating unit 38 are not used in the process of the first embodiment, i.e., the face evaluation value calculating unit 36 and the total evaluation value calculating unit 38 are not necessary in the image evaluation device 1 in a case where only the process of the first embodiment is carried out. In the following description, calculation of the individual evaluation value is described for each of the number of faces, the size of the face, the position of the face in the image, the orientation of the face, the rotational angle of the face, the detection score of the face, the positional relationship between faces if the image contains more than one faces and the front face ratio. Images to be evaluated have been read in by the image reading unit 24 and stored in the hard disk 28.

The CPU 12 starts the process as the user instructs to start evaluation of the images via the input unit 16. First, an image to be evaluated is read out from the hard disk 28 (step ST1), and the face detection unit 30 detects a region of a person's face in the image (step ST2). Specifically, pattern matching is performed between an average face pattern contained in a reference rectangular area and the image to be evaluated, such that an area on the image corresponding to the rectangular area that matches the best with the average face pattern is determined to be a face region. The pattern matching is a technique in which a degree of matching between the average face pattern and each area on the image is calculated with the average face pattern being gradually shifted on the image with the size and the rotational angle of the average face pattern on the image plane being gradually changed by a predetermined amount.

The technique for detecting a face is not limited to the above-described pattern matching, and any other techniques may be used, such as using face classifiers generated through machine learning using many face sample images, detecting a rectangular area containing a contour shape of a face and has a skin color on the image as a face region, or detecting an area having a contour shape of a face as a face region. If the image to be evaluated contains more than one faces, all the face regions are detected.

Subsequently, the information acquiring unit 32 acquires the feature information of the face contained in the image from the detected face region (step ST3). Specifically, at least one type of information containing at least the number of faces and optionally including any of the size of the face, the position of the face in the image, the orientation of the face, the rotational angle of the face, the detection score of the face, the positional relationship between faces if the image contains more than one faces and the front face ratio is acquired as the feature information.

The information about the number of faces is the number of face regions contained in the image detected by the face detection unit 30.

Information about the size of the face may, for example, be the number of pixels in the face region, a ratio of the face region to the entire image or a ratio of the face region to the width of the image. In this embodiment, a ratio of the face region to the width of the image is acquired as the information about the size of the face.

Information about the position of the face is indicated by ratios of coordinate values at the center of the face region (for example, if the face region is rectangular, the intersection point of diagonal lines) to the transverse and longitudinal lengths of the image. In this case, the point of origin of the coordinates is set at the lower-left corner of the landscape-oriented image, and the transverse direction is set along the x-axis and the longitudinal direction is set along the y-axis. Assuming that the length of the image in the x-direction is 100, the length of the image in the y-direction is 50 and the coordinates at the center of the face region are (45,15), the information about the position of the face is expressed as (0.45,0.30). If the position of the face is at the center of the image, the information about the position of the face is expressed as (0.50,0.50).

Information about the orientation of the face may be information indicating that the face contained in the face region is front-oriented or side-oriented. The orientation of the face can be determined by detecting an eye from the face region, such that the face is front-oriented if two eyes are detected from the face region, and the face is side-oriented if one eye is detected from the face region. Alternatively, the front or side orientation of the face may be determined based on a feature quantity indicating the orientation of the face acquired from the face region.

The rotational angle of the face is a rotational angle of the face contained in the face region in the image plane. As the rotational angle of the face, the rotational angle of the average face pattern when the face is detected by the face detection unit 30 can be used. The information about the rotational angle is expressed by an angle within 360 degrees with an increment of 45 degrees. Therefore, the information about the rotational angle of the face may take a value of 0, 45, 90, 135, 180, 225, 270 or 315 degrees. If the actual rotational angle of the face detected by the face detection unit 30 takes a value between these values, one of the values nearer to the actual value is used. For example, if the actual rotational angle of the face detected by the face detection unit 30 is 30 degrees, the rotational angle of the face is expressed as 45 degrees.

Information about the detection score of the face is expressed by a value of the degree of matching calculated by the face detection unit 30.

Figure 3A:
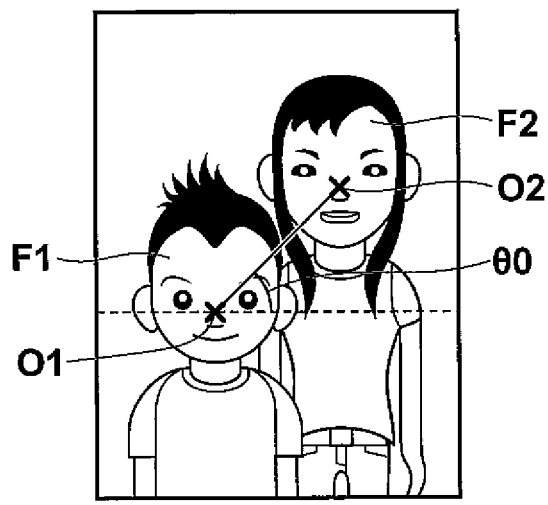
FIGS. 3A and 3B illustrate examples of a positional relationship between faces for an image containing more than one faces.
Figure 3B:
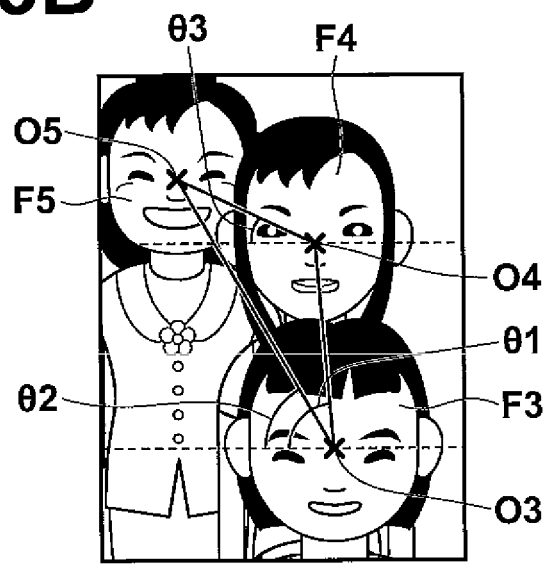

Information about the positional relationship between faces if the image contains more than one faces can be expressed by an angle between a horizontal line of the image and a line segment connecting the center of the face to be evaluated and the center of the other of the faces contained in the image. For example, if the image contains two faces F1 and F2, as shown in FIG. 3A, an angle $\theta 0$ formed between the horizontal line of the image and the line segment connecting the centers O1 and O2 of the faces can be used as the information about the positional relationship for both of the two faces F1 and F2. Further, if the image contains three faces F3 to F5, as shown in FIG. 3B, an angle $\theta 1$ formed between the horizontal line and the line segment connecting the centers O3 and O4 of the faces F3 and F4, an angle $\theta 2$ formed between the horizontal line and the line segment connecting the centers O3 and O5 of the faces F3 and F5, and an angle $\theta 3$ formed between the horizontal line and the line segment connecting the centers O4 and O5 of the faces F4 and F5 are found. Then, if the face F3 is set as the face to be evaluated, the angles $\theta 1$ and $\theta 2$ are used to indicate the positional relationship between the face to be evaluated and the other faces. If the face F4 is set as the face to be evaluated, the angles $\theta$ and $\theta 3$ are used. If the face F5 is set as the face to be evaluated, the angles $\theta 2$ and $\theta 3$ are used.

Information about the front face ratio is a ratio of front-oriented face(s) to all the faces contained in the image. For example, if the image contains four faces and one of them is the front-oriented face, the front face ratio is 25%.

In this manner, the information acquiring unit 32 may acquire the feature information containing the following values, for example: "2" as the number of faces, and for the first face, "0.30" as the size of the face, "(0.45,0.30)" as the position of the face in the image, "front" as the orientation of the face, "0 degrees" as the rotational angle of the face, "500" as the detection score of the face, "30 degrees" as the positional relationship between faces if the image contains more than one faces, and "50%" as the front face ratio. Further, the feature information for the second face may contain the following values: "0.35" as the size of the face, "(0.85,0.40)" as the position of the face in the image, "side" as the orientation of the face, "0 degrees" as the rotational angle of the face, "400" as the detection score of the face, "30 degrees" as the positional relationship between faces if the image contains more than one faces, and "50%" as the front face ratio.

Figure 4:
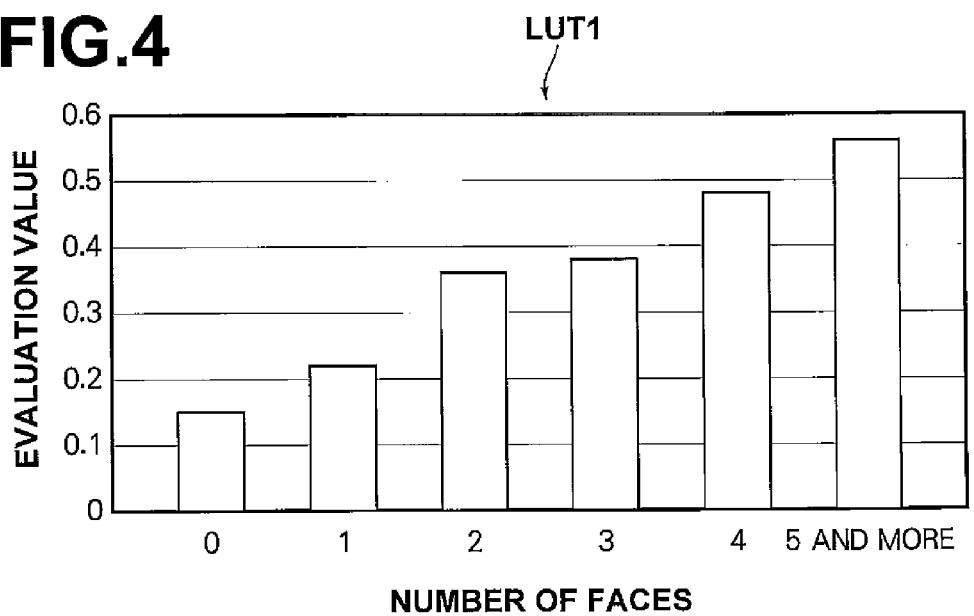
FIG. 4 illustrates an evaluation value table LUT1 for the number of faces.
Figure 5:
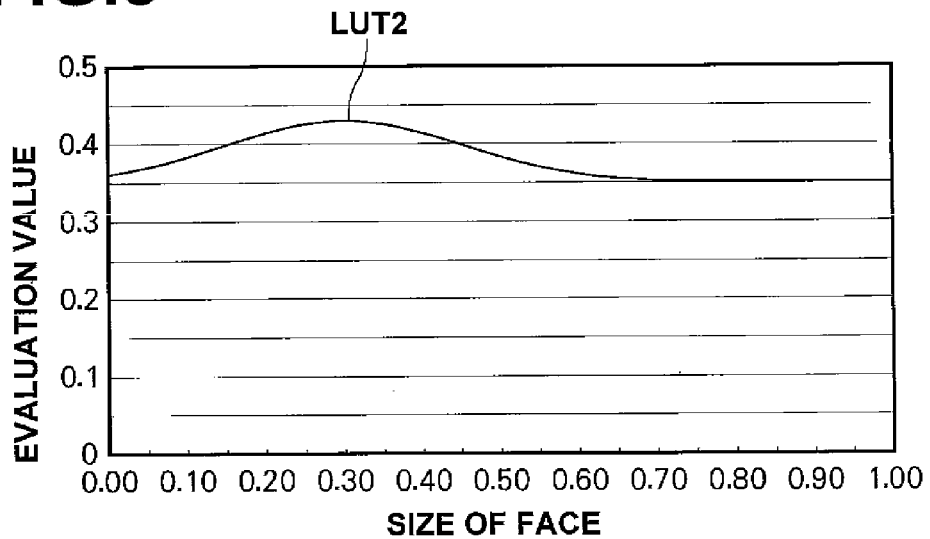
FIG. 5 illustrates an evaluation value table LUT2 for a size of the face.
Figure 9:
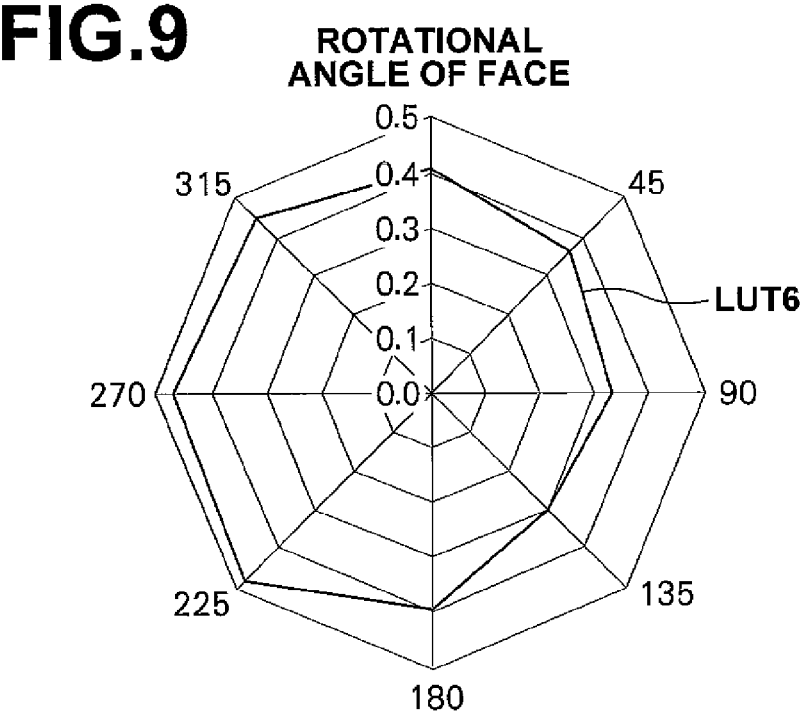
FIG. 9 illustrates an evaluation value table LUT6 for a rotational angle of the face.
Figure 10:
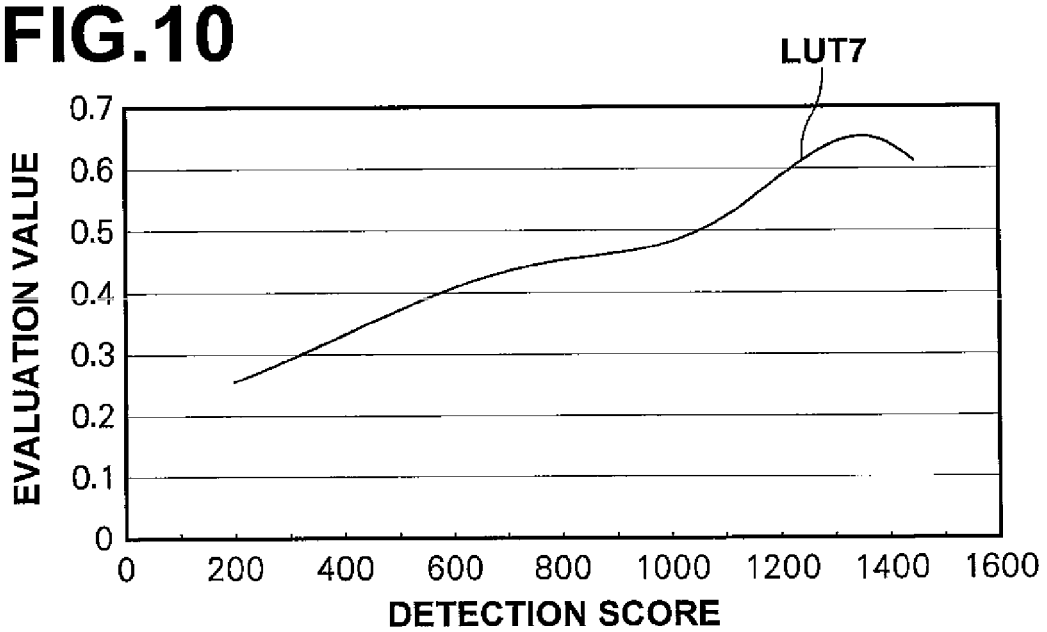
FIG. 10 illustrates an evaluation value table LUT7 for a detection score of the face.
Figure 11:
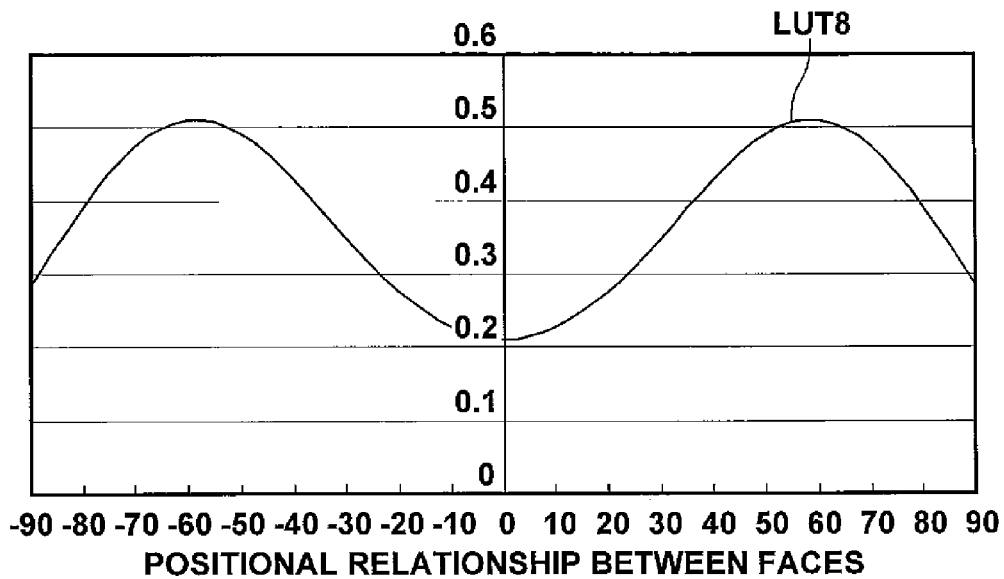
FIG. 11 illustrates an evaluation value table LUT8 for a positional relationship between faces if the image contains more than one faces.
Figure 12:
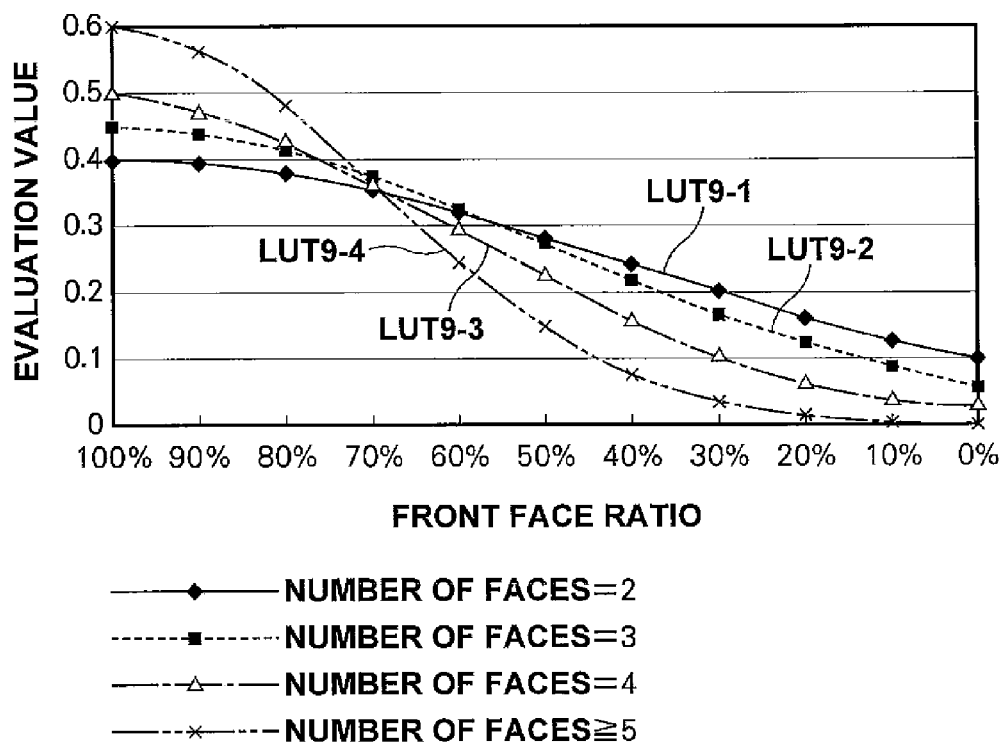
FIG. 12 illustrates evaluation value tables for a front face ratio.

In this embodiment, evaluation value tables for calculating the evaluation values, which have been statistically determined in advance based on various feature information of various faces, is stored on the hard disk 28. FIG. 4 shows an evaluation value table LUT1 for the number of faces, FIG. 5 shows an evaluation value table LUT2 for the size of the face, FIG. 6 shows an evaluation value table LUT3 for the position of the face in the x-direction, FIG. 7 shows an evaluation value table LUT4 for the position of the face in the y-direction, FIG. 8 shows an evaluation value table LUT5 for the orientation of the face, FIG. 9 shows an evaluation value table LUT6 for the rotational angle of the face, FIG. 10 shows an evaluation value table LUT7 for the detection score of the face, FIG. 11 shows an evaluation value table LUT8 for the positional relationship between faces, and FIG. 12 shows evaluation value tables LUT9-1 to LUT9-4 for the front face ratio. For the front face ratio, multiple evaluation value tables are prepared correspondingly to the numbers of faces contained in the image.

These evaluation value tables are determined based on evaluation values of a lot of sample images containing various numbers of faces having various sizes at various positions in the images with various orientations, various rotational angles, various detection scores, various positional relationships between the faces in the images containing more than one faces, and various front face ratios, evaluated by multiple evaluators. Each evaluation value table is obtained by plotting a relationship between values of the number of faces, the size of the face, the position of the face in the image, the orientation of the face, the rotational angle of the face, the detection score of the face, the positional relationship between faces if the image contains more than one faces or the front face ratio of the sample images and averages of results of evaluation by all the evaluators.

In these evaluation value tables, perfect scores for the number of faces, the positional relationship between faces if the image contains more than one faces and the front face ratio are 0.6, perfect scores for the size of the face, the position of the face in the image, the orientation of the face and the rotational angle of the face are 0.5, and a perfect score for the detection score of the face is 0.7.

Subsequently, the individual evaluation value calculating unit 34 reads out the evaluation value table corresponding to each feature information of the face from the hard disk 28 (step ST4), and calculates the individual evaluation value indicating the result of evaluation for the feature information based on the read out evaluation value table and the feature information of the face (step ST5).

Namely, if the feature information of the face is the number of faces, the evaluation value table LUT1 is read out and an individual evaluation value E1 is calculated. It should be noted that, since the "number of faces" feature is always included as the feature of the face in this embodiment, the individual evaluation value E1 is always calculated.

If the feature information of the face is the size of the face, the evaluation value table LUT2 is read out and an individual evaluation value E2 is calculated. If the feature information of the face is the position of the face in the image, the evaluation value tables LUT3 and LUT4 are read out and individual evaluation values E3 and E4 are calculated. A final evaluation value for the position of the face can be a sum of the individual evaluation values E3 and E4. If the feature information of the face is the orientation of the face, the evaluation value table LUT5 is read out and an individual evaluation value E5 is calculated. If the feature information of the face is the rotational angle of the face, the evaluation value table LUT6 is read out and an individual evaluation value E6 is calculated. If the feature information of the face is the detection score of the face, the evaluation value table LUT7 is read out and an individual evaluation value E7 is calculated. If the feature information of the face is the positional relationship between faces if the image contains more than one faces, the evaluation value table LUT8 is read out and an individual evaluation value E8 is calculated. If the feature information of the face is the front face ratio, the evaluation value tables LUT9-1 to LUT9-4 are read out and an individual evaluation value E9 is calculated.

Then, the individual evaluation value calculating unit 34 determines whether or not the image to be evaluated contains another face region (step ST6). If a negative determination is made in step ST6, the process ends. If an affirmative determination is made in step ST6, the next face region is set as the face to be evaluated (step ST7). Then, the process returns to step ST3 and operations in step ST3 and the following steps are repeated. In this manner, at least the individual evaluation value E1 and optionally any of individual evaluation values E2 to E9 are calculated for each face contained in the image.

The individual evaluation value E8 for the positional relationship between faces if the image contains more than one faces can be calculated by calculating individual evaluation values for the face region to be evaluated and the other face region(s), and averaging these individual evaluation values. For example, in the case of the image shown in FIG. 3A, the position of the face F2 relative to the position of the face F1 is expressed in the above-described positional relationship as 45 degrees, and therefore the individual evaluation value E8 for the positional relationship with respect to the face F1 is 0.45. Further, the position of the face F1 relative to the position of the face F2 is expressed as −45 degrees, and therefore the individual evaluation value E8 for the positional relationship with respect to the face F2 is 0.45.

In the case of the image shown in FIG. 3B, the position of the face F4 relative to the position of the face F3 is expressed as 85 degrees, and therefore the evaluation value is 0.35. The position of the face F5 relative to the position of the face F3 is expressed as 60 degrees, and therefore the evaluation value is 0.51. Therefore, the individual evaluation value E8 for the positional relationship with respect to the face F3 is 0.43, which is an average of 0.35 and 0.51. Further, the position of the face F3 relative to the position of the face F4 is expressed as −85 degrees, and therefore the evaluation value is 0.35. The position of the face F5 relative to the position of the face F4 is expressed as 25 degrees, and therefore the evaluation value is 0.32. Therefore, the individual evaluation value E5 for the positional relationship with respect to the face F4 is 0.335, which is an average of 0.35 and 0.32. Furthermore, the position of the face F3 relative to the position of the face F5 is expressed as −60 degrees, and therefore the evaluation value is 0.51. the position of the face F4 relative to the position of the face F5 is expressed as −25 degrees, and therefore the evaluation value is 0.32. Therefore, the individual evaluation value E5 for the positional relationship with respect to the face F5 is 0.415, which is an average of 0.51 and 0.32.

As described above, according to the first embodiment, at least one type of feature information including at least the number of faces and optionally including any of the size of the face, the position of the face in the image, the orientation of the face, the rotational angle of the face, the detection score of the face, the positional relationship between faces if the image contains more than one faces and the front face ratio is acquired from the image, and the individual evaluation value indicating the result of evaluation for each feature information is statistically calculated based on the acquired feature information. Thus, average viewers' taste can be reflected on the individual evaluation values, thereby allowing more accurate evaluation of images using the individual evaluation values.

It should be noted that, in the above-described first embodiment, two or more types of mutually relating information among the number of faces, the size of the face, the position of the face in the image, the orientation of the face, the rotational angle of the face, the detection score of the face, the positional relationship between faces if the image contains more than one faces and the front face ratio may be acquired, and a result of evaluation based on the two or more types of mutually relating information may be calculated as the individual evaluation value.

Figure 13:
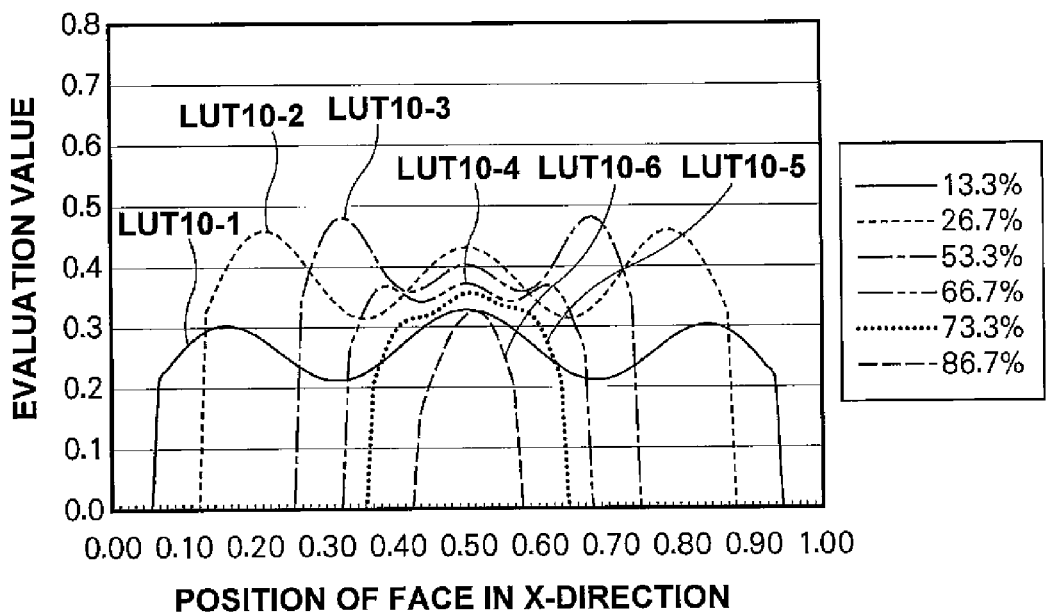
FIG. 13 illustrates evaluation value tables for a size and a position (in the x-direction) of the face.
Figure 14:
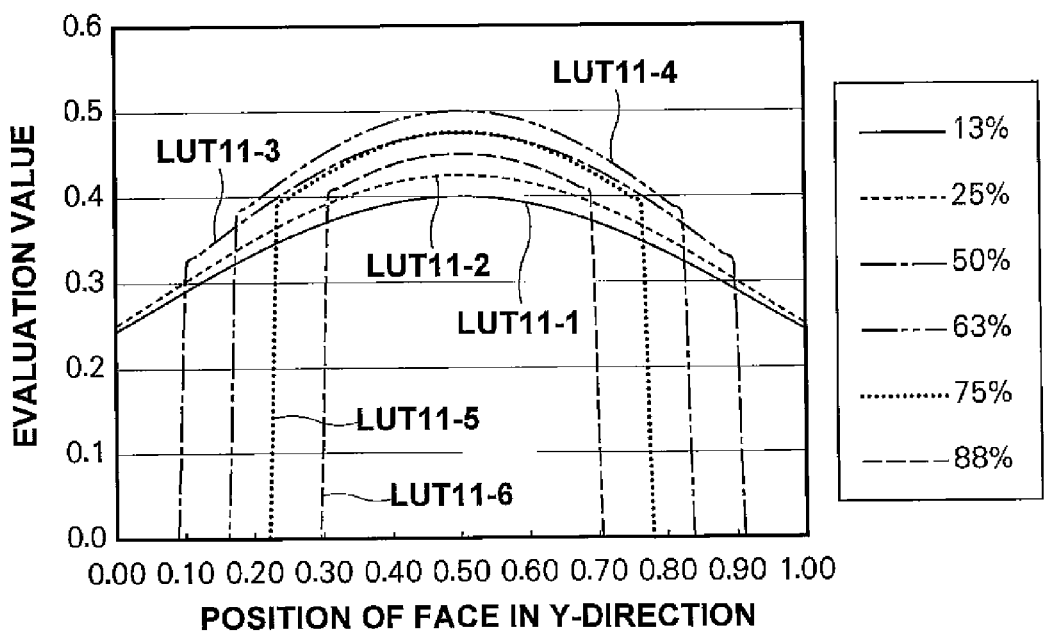
FIG. 14 illustrates evaluation value tables for a size and a position (in the y-direction) of the face.

For example, the size of the face and the position of the face may be set as the mutually relating information, and the individual evaluation value may be calculated based on the size and the position of the face. In this case, an evaluation value table for calculating this evaluation value is statistically determined in advance based on various sizes and positions of faces and stored in the hard disk 28. FIG. 13 shows evaluation value tables LUT10-1 to LUT10-6 for the size of the face and the position of the face in the x-direction, and FIG. 14 shows evaluation value tables LUT11-1 to LUT11-6 for the size of the face and the position of the face in the y-direction. As shown in FIG. 13, the evaluation value tables LUT10-1 to LUT10-6 are obtained by plotting values of the positional information in the x-direction along the transverse axis and average values of evaluation by multiple evaluators along the longitudinal axis for different sizes of the face expressed in percentage as 13.3%, 26.7%, 53.3%, 66.7%, 73.3% and 86.7%. Further, as shown in FIG. 14, the evaluation value tables LUT11-1 to LUT11-6 are obtained by plotting values of the positional information in the y-direction along the transverse axis and average values of evaluation by the multiple evaluators along the longitudinal axis for different sizes of the face expressed in percentage as 13%, 25%, 50%, 63%, 75% and 88%.

It should be noted that, if the size of the face takes a value between the sizes of face corresponding to the evaluation value tables LUT10-1 to LUT10-6 and LUT11-1 to LUT11-6, the evaluation value for the face can be calculated through interpolation using two of the tables having the nearest values. For example, if the size of the face takes a value between the sizes of face corresponding to the evaluation value tables LUT10-1 and LUT10-2, the evaluation value for the face can be calculated through interpolation using the evaluation value tables LUT10-1 and LUT10-2.

In this manner, the individual evaluation value calculating unit 34 calculates individual evaluation values E10 and E11 indicating results of evaluation of the image based on the evaluation value tables LUT10-1 to LUT10-6 and LUT11-1 to LUT11-6 as well as the information about the size of the face and the position of the face, and may calculate a sum or weighted sum of the individual evaluation values E10 and E11 to obtain a final individual evaluation value.

It should be noted that the two or more types of mutually relating information are not limited to the information about the size of the face and the position of the face, and the evaluation value may be calculated based on any combination of the information about the size of the face, the position of the face in the image, the orientation of the face, the rotational angle of the face, the positional relationship between faces if the image contains more than one faces and the detection score of the face, which relate to each other, such as the information about the rotational angle of the face and the position of the face or the information about the size of the face, the position of the face and the rotational angle of the face. In this case, an evaluation value table corresponding to the combination of two or more types of information to be used is prepared in advance and stored in the hard disk 28.

Next, a process according to a second embodiment carried out by the image evaluation device 1 shown in FIG. 1 will be described. In the second embodiment, the face evaluation value, which is an evaluation value for each face contained in the image, is calculated based on at least one type of feature information including at least the number of faces and optionally including any of the size of the face, the position of the face in the image, the orientation of the face, the rotational angle of the face, the detection score of the face, the positional relationship between faces if the image contains more than one faces and the front face ratio. Therefore, the total evaluation value calculating unit 38 is not used in the process of the second embodiment, i.e., the total evaluation value calculating unit 38 is not necessary in the image evaluation device 1 in a case where only the process of the second embodiment is carried out. Since the calculation of the individual evaluation values in the second embodiment is carried out in the same manner as in the above-described first embodiment, only operations carried out after the individual evaluation values have been calculated for all the faces contained in the image, i.e., operations carried out after step ST5 of the flow chart shown in FIG. 2 are described in the following description. It is assumed in the following description that all the individual evaluation values E1 to E9 have been calculated.

Figures 15, 16:
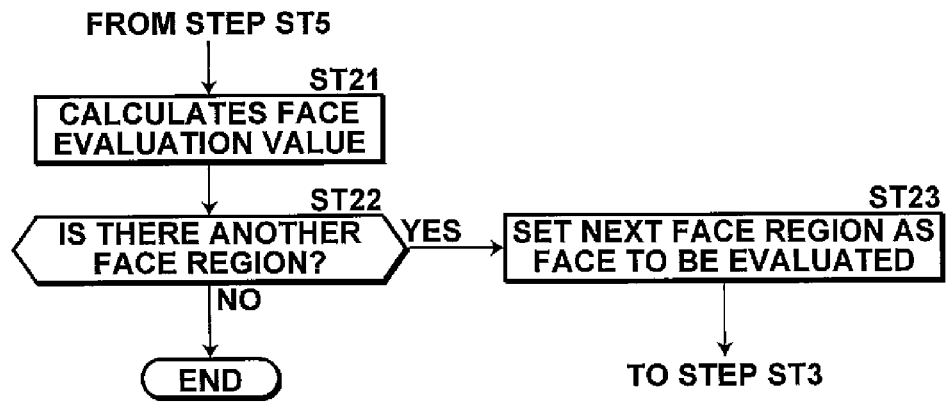
FIG. 15 is a flow chart illustrating a process according to a second embodiment of the invention.
FIG. 16 illustrates a specific example of calculation of a face evaluation value.

FIG. 15 is a flow chart illustrating the process of the second embodiment carried out by the image evaluation device 1 shown in FIG. 1. Following step ST5 shown in FIG. 2, the face evaluation value calculating unit 36 calculates the face evaluation value, which is an evaluation value of the face, using the individual evaluation values E1 to E9 (step ST21).

Specifically, a weighted sum of the individual evaluation values E1 to E9 for all of the number of faces, the size of the face, the position of the face in the image, the orientation of the face, the rotational angle of the face, the detection score of the face, the positional relationship between faces if the image contains more than one faces and the front face ratio is calculated according to equation (1) shown below to obtain a face evaluation value Ef0:

$$Ef0 = \Sigma \alpha i Ei (i=1 \ to \ 9) \quad (1),$$

wherein $\alpha i$ is a weighting factor.

FIG. 16 shows a specific example of calculation of the face evaluation value Ef0. If the individual evaluation values and the weighting factors take values shown in FIG. 16, the calculated face evaluation value is 0.369.

Then, the face evaluation value calculating unit 36 determines whether or not the image to be evaluated contains another face region (step ST22). If a negative determination is made in step ST22, the process ends. If an affirmative determination is made in step ST22, the next face region is set as the face to be evaluated (step ST23). Then, the process returns to step ST3 of the flow chart shown in FIG. 2, and operations in step ST3 and the following steps are repeated.

As described above, in the second embodiment, the face evaluation value, which is an evaluation value of each face, is calculated from the individual evaluation values to evaluate the face with higher accuracy.

It should be noted that, although the face evaluation value is calculated from the number of faces, the size of the face, the position of the face in the image, the orientation of the face, the rotational angle of the face, the detection score of the face, the positional relationship between faces if the image contains more than one faces and the front face ratio in the above-described second embodiment, the face evaluation value may be calculated additionally using two or more types of mutually relating information. Alternatively, the face evaluation value may be calculated using at least one type of information including at least the number of faces and optionally including any of the size of the face, the position of the face in the image, the orientation of the face, the rotational angle of the face, the detection score of the face, the positional relationship between faces if the image contains more than one faces and the front face ratio.

Further, in the above-described second embodiment, the types of the feature information to be acquired and the weighting factors to be used may be changed according to the number of faces contained in the image. FIG. 17 shows an example of the types of feature information and the weighting factors to be used depending on the number of faces. As shown in FIG. 17, if the number of faces is 1, only the individual evaluation values for the number of faces, the size of the face, the position of the face in the image, the orientation of the face, the rotational angle of the face and the detection score of the face may be calculated to reduce the amount of calculation for calculating the face evaluation value. If more than one faces are contained in the image, the individual evaluation values for the number of faces, the size of the face, the position of the face in the image, the orientation of the face, the rotational angle of the face, the detection score of the face, the positional relationship between faces if the image contains more than one faces and the front face ratio are calculated, and the weighting factors are changed depending on the number of faces. In this manner, the face evaluation value can be accurately calculated depending on the number of faces.

Next, a process according to a third embodiment carried out by the image evaluation device 1 shown in FIG. 1 will be described. In the third embodiment, the total evaluation value, which is a total evaluation value of the image, is calculated based on the face evaluation value calculated in the second embodiment. Since the calculation of the face evaluation value in the third embodiment is carried out in the same manner as in the above-described second embodiment, only operations carried out after the face evaluation values have been calculated for all the faces contained in the image, i.e., operations carried out after the negative determination in step ST22 of the flow chart shown in FIG. 15 are described in the following description.

FIG. 18 is a flow chart illustrating the process of the third embodiment carried out by the image evaluation device 1 shown in FIG. 1. As the negative determination is made in step ST22 shown in FIG. 15, the total evaluation value calculating unit 38 selects a representative face from the faces contained in the image (step ST31). Specifically, if the image contains more than one faces, the face having the largest face evaluation value, the face having the largest size, the face nearest to the center of the image, the most front-oriented face, the most vertical-oriented face, or the face having the highest detection score is selected as the representative face. Alternatively, the face that meets more than one of these conditions may be selected as the representative face. If the image contains one face, the face is selected as the representative face.

Then, the total evaluation value calculating unit 38 determines the face evaluation value of the representative face as the total evaluation value of the image (step ST32), and the process ends.

The selection of the representative face and the determination of the total evaluation value are explained using FIG. 19. It is assumed in this example that the image contains three faces F1 to F3 and the face evaluation values for the respective faces are 0.38, 0.45 and 0.40. If the face having the largest face evaluation value is selected as the representative face, the representative face is the face F2 and the total evaluation value is 0.45. If the face having the largest size is selected as the representative face, the representative face is the face F3 and the total evaluation value is 0.40. If the face nearest to the center of the image in the x-direction is selected as the representative face, the representative face is the face F2, which has the value nearest to 0.5 for the information of the position in the x-direction, and the total evaluation value is 0.45. If the face nearest to the center of the image in the y-direction is selected as the representative face, the representative face is the face F1, which has the value nearest to 0.5 for the information of the position in the y-direction, and the total evaluation value is 0.38. If the most front-oriented face is selected as the representative face, the representative face is the face F2 and the total evaluation value is 0.45. If the most vertical-oriented face is selected as the representative face, the representative face is the face F2 and the total evaluation value is 0.45. If the face having the largest detection score is selected as the representative face, the representative face is the face F1 and the total evaluation value is 0.38.

As described above, in the third embodiment, the total evaluation value, which is a total evaluation value of the image, is calculated from the face evaluation value to evaluate the image with higher accuracy.

Next, a process according to a fourth embodiment carried out by the image evaluation device 1 shown in FIG. 1 will be described. In the fourth embodiment, the total evaluation value, which is a total evaluation value of the image, is calculated based on the face evaluation values calculated in the second embodiment. Since the calculation of the face evaluation value in the fourth embodiment is carried out in the same manner as in the above-described second embodiment, only operations carried out after the face evaluation values have been calculated for all the faces contained in the image, i.e., operations carried out after the negative determination in step ST22 of the flow chart shown in FIG. 15 are described in the following description.

FIG. 20 is a flow chart illustrating the process of the fourth embodiment carried out by the image evaluation device 1 shown in FIG. 1. As the negative determination is made in step ST22 shown in FIG. 15, the total evaluation value calculating unit 38 sets weighting factors for calculating a weighted sum of the face evaluation values of the faces contained in the image as shown by equation (2) (step ST41), and calculates the total evaluation value using the set weighting factors according to equation (2) below (step ST42):

$$Es = \Sigma \beta j E f j \qquad (2),$$

wherein j is the number of face evaluation values, $\beta j$ is a weighting factor, and $\Sigma \beta j = 1$. Then, the process ends.

The weighting factors may be set such that a larger weighting factor is used for the face nearer to the center of the image, or a larger weighting factor is used for the face having a larger size.

FIG. 21 shows a specific example of the calculation of the total evaluation value Es. If the image contains three faces F1 to F3 and the face evaluation values and the weighting factors take values shown in FIG. 21, the calculated total evaluation value is 0.361.

As described above, in the fourth embodiment, the total evaluation value, which is a total evaluation value of the image, is calculated from the face evaluation values to evaluate the image with higher accuracy.

Figure 22:
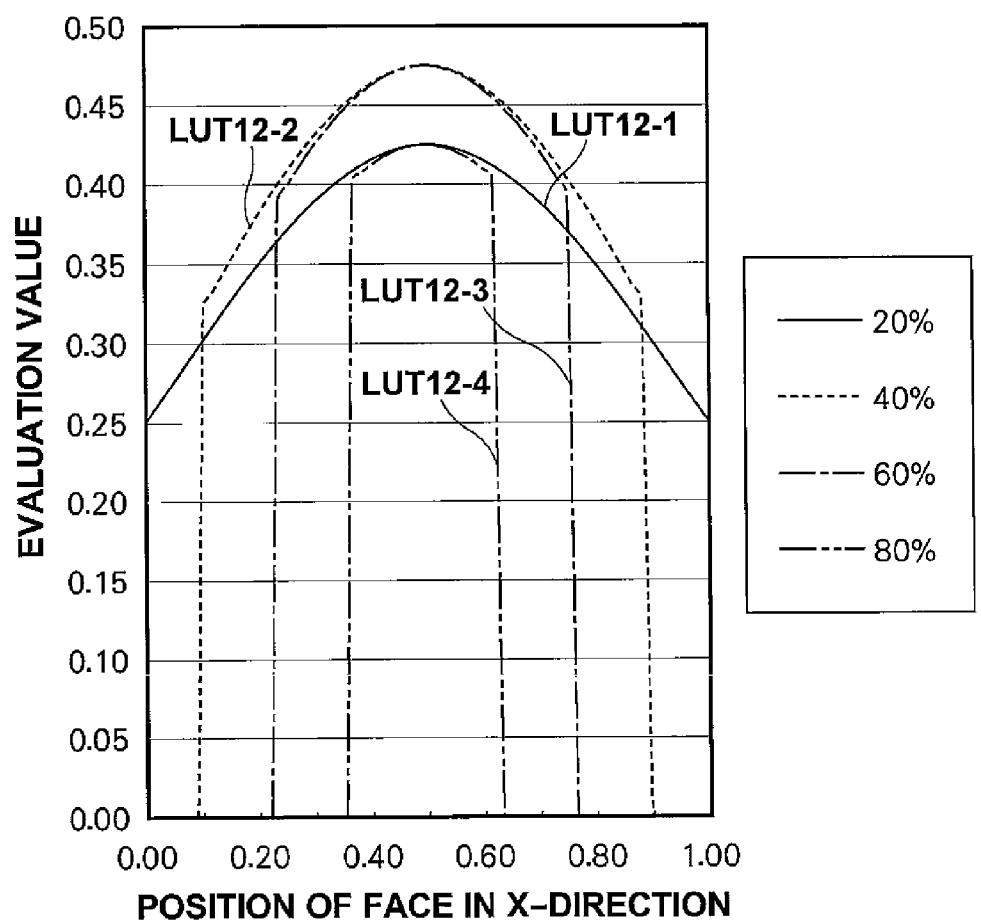
FIG. 22 illustrates an evaluation value table for a size and a position (in the x-direction) of the face for a portrait-oriented image.

It should be noted that, in a case where the evaluation value is calculated based on the information about the size and the position of the face in the above-described first to fourth embodiments, if the image is portrait-oriented, evaluation of the image should be made in a different manner from evaluation of the landscape-oriented images. Therefore, if the image is portrait-oriented, it is preferable to use evaluation value tables LUT12-1 to LUT12-4 that define, for various sizes of faces, relationships between positions of the face in the x-direction and evaluation values, as shown in FIG. 22.

The device 1 according to the embodiments of the invention has been described above. However, the invention may also be implemented as a program for causing a computer to function as means corresponding to the face detection unit 30, the information acquiring unit 32, the individual evaluation value calculating unit 34, the face evaluation value calculating unit 36 and the total evaluation value calculating unit 38 described above to carry out the operations as shown in FIGS. 2, 15, 18 and 20. Further, the invention may also be implemented as a computer readable recording medium containing such a program. In these cases, the evaluation value tables may be contained in the program or in the same recording medium with the program, or may be provided from an external device or another medium.

According to the invention, from an image containing at least one face, at least one type of information including at least the number of faces and optionally including any of a size of the face, a position of the face in the image, an orientation of the face, a rotational angle of the face and a detection score of the face is acquired, and an individual evaluation value indicating a result of evaluation for each type of information is calculated based on the acquired information. Thus, average viewers' taste can be reflected on the individual evaluation values, thereby allowing more accurate evaluation of the face contained in the image and more accurate evaluation of the image using the individual evaluation values.

What is claimed is:

1. An image evaluation device comprising:
 information acquiring means to acquire, from an image containing more than one face, information including a first evaluation value indicating a positional relationship of each face with respect to other faces in the image containing more than one face, and at least one type of information including a second evaluation value, independent from the first evaluation value, indicating at least the number of the faces in the image and optionally including any of a size of the face, a position of the face in the image, an orientation of the face, a rotational angle of the face and a detection score of the face; and
 individual evaluation value calculating means to statistically calculate an individual evaluation value indicating a result of evaluation for each type of information based on the acquired information.

2. The image evaluation device as claimed in claim 1, wherein the information acquiring means further acquires information including a front face ratio of the face.

3. The image evaluation device as claimed in claim 1 further comprising:
 face evaluation value calculating means to calculate a face evaluation value indicating a result of evaluation of the face based on the individual evaluation value.

4. The image evaluation device as claimed in claim 3 further comprising:
 total evaluation value calculating means to calculate a total evaluation value indicating a result of total evaluation of the image based on the face evaluation value.

5. The image evaluation device as claimed in claim 4, wherein the total evaluation value calculating means selects a representative face from the faces and calculates the total evaluation value based on the face evaluation value of the representative face.

6. The image evaluation device as claimed in claim 4, wherein the total evaluation value calculating means calculates the total evaluation value by calculating a weighted sum of the face evaluation values of the faces.

7. The image evaluation device as claimed in claim 3, wherein the total evaluation value calculating means calculates the face evaluation value differently depending on the number of the faces.

8. An image evaluation method comprising:
 reading an image from a recording medium;
 acquiring, from the image containing more than one face, information including a first evaluation value indicating a positional relationship of each face with respect to other faces in the image containing more than one face, and at least one type of information including a second evaluation, independent from the first evaluation value, indicating at least the number of the faces in the image and optionally including any of a size of the face, a position of the face in the image, an orientation of the face, a rotational angle of the face and a detection score of the face; and
 statistically calculating an individual evaluation value indicating a result of evaluation for each type of information based on the acquired information.

9. A non-transitory computer readable recording medium storing a program for causing a computer to carry out an image evaluation method comprising:
 acquiring, from an image containing more than one face, information including a first evaluation value indicating a positional relationship of each face with respect to other faces in the image containing more than one face, and at least one type of information including a second evaluation value, independent from the first evaluation value, indicating at least the number of the faces and optionally including any of a size of the face, a position of the face in the image, an orientation of the face, a rotational angle of the face and a detection score of the face; and
 statistically calculating an individual evaluation value indicating a result of evaluation for each type of information based on the acquired information.

10. An image evaluation device comprising:
 information acquiring means to acquire, from an image containing at least one face, at least one type of information including a first evaluation value indicating at least the number of the at least one face and optionally including a second evaluation value indicating any of a size of the face, a position of the face in the image, an orientation of the face, a rotational angle of the face and a detection score of the face;
 individual evaluation value calculating means to statistically calculate an individual evaluation value indicating a result of evaluation for each type of information based on the acquired information; and
 total evaluation value calculating means to calculate a total evaluation value indicating a result of total evaluation of the image based on a face evaluation value that indicates a result of evaluation of the face based on the individual evaluation value,
 wherein, if the image contains more than one face, the total evaluation value calculating means calculates the total evaluation value by calculating a weighted sum of the face evaluation values of the faces.

11. The image evaluation device as claimed in claim 10, wherein the information acquiring means further acquires information including at least one of a positional relationship between faces if the image contains more than one face and a front face ratio of the at least one face.

12. The image evaluation device as claimed in claim 10 further comprising:
   face evaluation value calculating means to calculate a face evaluation value indicating a result of evaluation of the face based on the individual evaluation value.

13. The image evaluation device as claimed in claim 12, wherein the total evaluation value calculating means calculates the face evaluation value differently depending on the number of the at least one face.

14. An image evaluation method comprising:
   reading an image from a recording medium;
   acquiring, from the image containing at least one face, at least one type of information including a first evaluation value indicating at least the number of the at least one face and optionally including a second evaluation value indicating any of a size of the face, a position of the face in the image, an orientation of the face, a rotational angle of the face and a detection score of the face;
   statistically calculating an individual evaluation value indicating a result of evaluation for each type of information based on the acquired information; and
   calculating a total evaluation value indicating a result of total evaluation of the image based on a face evaluation value that indicates a result of evaluation of the face based on the individual evaluation value,
   wherein, if the image contains more than one face, the total evaluation value is calculated by calculating a weighted sum of the face evaluation values of the faces.

15. A non-transitory computer readable recording medium storing a program for causing a computer to carry out an image evaluation method comprising:
   acquiring, from an image containing at least one face, at least one type of information including a first evaluation value indicating at least the number of the at least one face and optionally including a second evaluation value indicating any of a size of the face, a position of the face in the image, an orientation of the face, a rotational angle of the face and a detection score of the face;
   statistically calculating an individual evaluation value indicating a result of evaluation for each type of information based on the acquired information; and
   calculating a total evaluation value indicating a result of total evaluation of the image based on a face evaluation value that indicates a result of evaluation of the face based on the individual evaluation value,
   wherein, if the image contains more than one face, the total evaluation value is calculated by calculating a weighted sum of the face evaluation values of the faces.

* * * * *